(12) United States Patent
Rheinschmidt, Jr. et al.

(10) Patent No.: US 7,658,166 B1
(45) Date of Patent: Feb. 9, 2010

(54) ANTI-BARK TRAINING SYSTEM FOR DOGS

(76) Inventors: James J. Rheinschmidt, Jr., 595 Black Walnut Rd., Mosinee, WI (US) 54455-8676; Wendy F. Rheinschmidt, 595 Black Walnut Rd., Mosinee, WI (US) 54455-8676

( * ) Notice: Subject to any disclaimer, the term of this patent is extended or adjusted under 35 U.S.C. 154(b) by 241 days.

(21) Appl. No.: 11/852,293

(22) Filed: Sep. 8, 2007

(51) Int. Cl.
*A01K 15/02* (2006.01)
*A01K 15/00* (2006.01)

(52) U.S. Cl. ............................... 119/718; 119/712

(58) Field of Classification Search ............... 119/712, 119/718, 719, 721; 169/6, 7; 222/54, 146.2; 239/67, 69; A01K 15/00, 15/02
See application file for complete search history.

(56) References Cited

U.S. PATENT DOCUMENTS

| | | | |
|---|---|---|---|
| 2,706,229 A * | 4/1955 | Buske | 337/88 |
| 3,673,567 A * | 6/1972 | McClellan, Sr. | 119/718 |
| 3,823,691 A * | 7/1974 | Morgan | 119/718 |
| D248,312 S | 6/1978 | Zatorski | |
| 4,627,385 A | 12/1986 | Vinci | |
| 5,603,287 A * | 2/1997 | Houck | 119/719 |
| 6,173,727 B1 | 1/2001 | Davey | |
| 6,286,764 B1 * | 9/2001 | Garvey et al. | 236/12.12 |
| 6,405,939 B1 * | 6/2002 | Mazzenga et al. | 239/69 |
| 6,431,121 B1 * | 8/2002 | Mainini et al. | 119/718 |
| 6,450,128 B1 * | 9/2002 | Boyce | 119/713 |
| 6,588,376 B1 | 7/2003 | Groh | |
| 6,604,490 B1 | 8/2003 | Lee, IV et al. | |
| 6,668,760 B2 | 12/2003 | Groh et al. | |
| 2003/0154929 A1 * | 8/2003 | Groh et al. | 119/718 |
| 2006/0011144 A1 * | 1/2006 | Kates | 119/719 |
| 2008/0072841 A1 * | 3/2008 | So | 119/718 |
| 2009/0133640 A1 * | 5/2009 | Bai | 119/718 |

OTHER PUBLICATIONS

AMTEK Pet.com, Pet Behavior Products, Sprinkler Barker Braker, http://www.ametekpet.com/ attached as RHEI_P0001_Amtek_Pet_Products_NPL_April_13_2009.
AMTEK Pet.com, Pet Behavior Products, Sprinkler Barker Braker, http://www.ametekpet.com/ attached as RHEI_P0001_6_Amtek_Pet_Products_NPL_September_4_2007.

* cited by examiner

*Primary Examiner*—Son T Nguyen
*Assistant Examiner*—Marisa Conlon

(57) ABSTRACT

This patent discloses a system to train a dog to reduce barking while the dog is kept in an outdoor dog pen. The system may include a bark switch connected between a transformer and a power supply, a water valve operatively connected to the transformer and connected between a supply hose and a spray hose, a water supply connected to the supply hose, and a sprinkler head connected to the spray hose. Those components that may freeze may be located in a heated building. If the bark switch receives a bark of a predetermined intensity, the bark switch allows the power supply to send power to open the water valve so that water sprays a predetermined area of the dog pen. A timer may shut off the water spray and a lack of bark from the dog may keep the water spray from being turned on again.

7 Claims, 4 Drawing Sheets

ANTI-BARK TRAINING SYSTEM FOR DOGS

BACKGROUND

1. Field

The information disclosed in this patent relates to a system to train dogs to reduce their barking and/or howling such as when being kept outdoors.

2. Background Information

Barking is the one of the noises most commonly produced by dogs. Dogs bark frequently and in many different situations, some of which may be traced to their retention of juvenile characteristics adulthood. Barks are often accompanied by body movements as part of a broader package of dog communication.

Individual dogs bark for a variety of reasons. They may bark to attract attention, to communicate a message, or to express excitement. Disturbance barks tend to be harsh, low frequency, and unmodulated, whereas isolation and play barks tend to be tonal, higher frequency, and modulated. In either case, canine barking can be a nuisance to neighbors, and is a common problem faced by some dog owners and their neighbors.

There are several methods available to control a barking dog. Some individuals use bark collars containing citrus spray, sonic/ultrasonic vibrations, and electrical shocks, but many groups have disparaged these types of collars. Debarking by modifying the dog's voice box so that a barking dog will make a significantly reduced noise is an extreme technique that is not widely accepted. Others try voice commands, but it is not often that dogs who are prone to barking will respond to voice commands. What is needed is an anti-bark training system for dogs.

SUMMARY

This patent discloses a system to train a dog to reduce barking while the dog is kept in an outdoor dog pen. The system may include a bark switch connected between a transformer and a power supply, a water valve operatively connected to the transformer and connected between a supply hose and a spray hose, a water supply connected to the supply hose, and a sprinkler head connected to the spray hose. Those components that may freeze may be located in a heated building. If the bark switch receives a bark of a predetermined intensity, the bark switch allows the power supply to send power to open the water valve so that water sprays a predetermined area of the dog pen. A timer may shut off the water spray and a lack of bark from the dog may keep the water spray from being turned on again.

DETAILED DESCRIPTION

Figure 1:
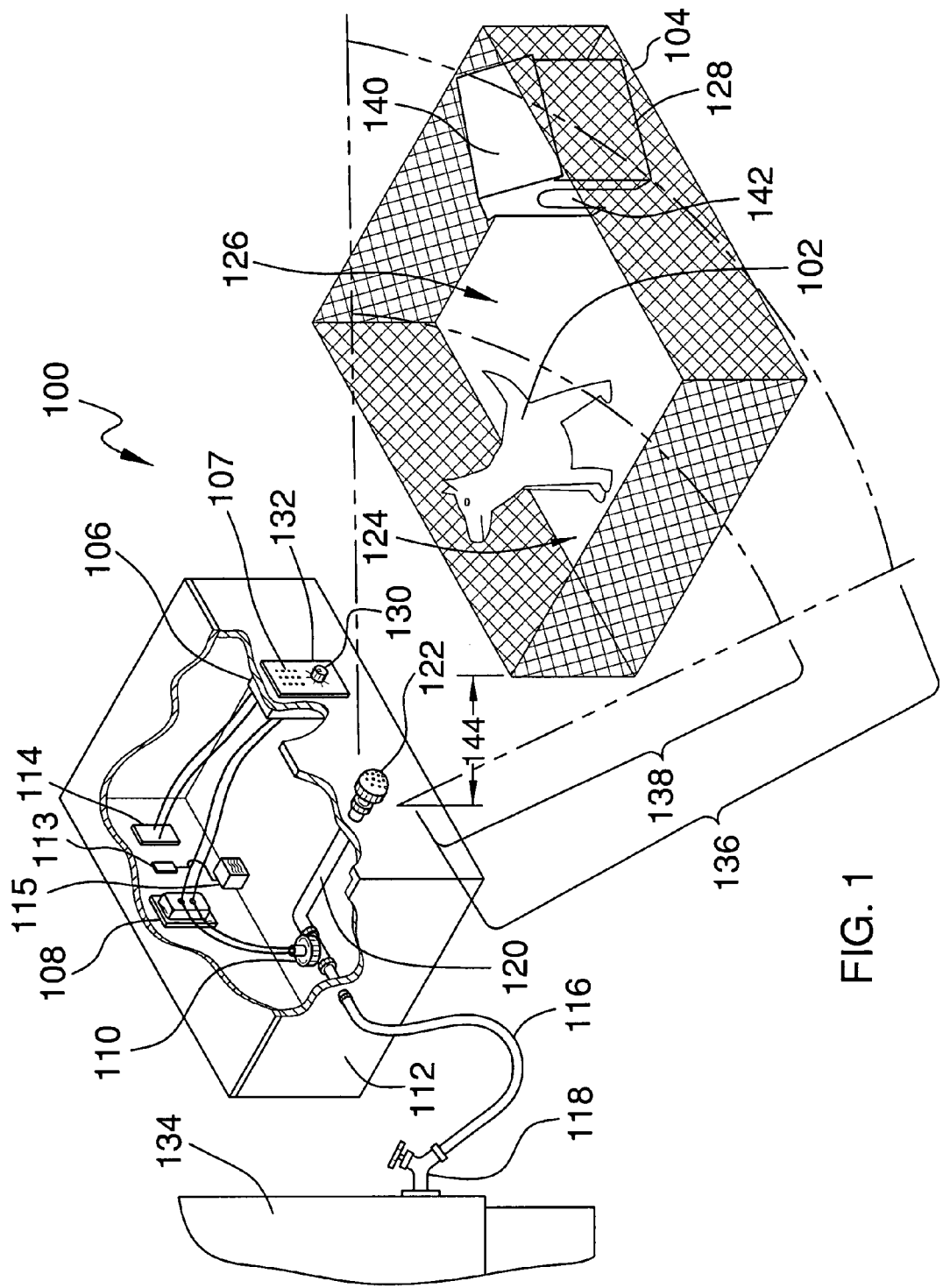
FIG. 1 is an isometric view of a system 100.

FIG. 1 is an isometric view of a system 100. System 100 may be an anti-bark training system for a dog 102. System 100 may include a water sprinkler that may be used to discipline or train a dog. By repeatedly dousing dog 102 with water from system 100 as dog 102 barks, dog 102 may self-learn to control barking.

System 100 may include a dog pen 104, a bark switch 106, a transformer 108, a water valve 110, a building 112, a power supply 114, a supply hose 116, a water supply 118, a spray hose 120, and a sprinkler head 122. Dog 102 may reside in dog pen 104. Bark switch 106, transformer 108, and water valve 110 may reside in building 112, with transformer 108 connected between bark switch 106 and water valve 110. A bark switch receiver 107 of bark switch 106 may reside outside of building 112 to receive barking sounds from dog 102. Power supply 114 may be connected to bark switch 106. Water supply 118 may be connected to water valve 110 through supply hose 116. In addition, sprinkler head 122 may be connected to water valve 110 through spray hose 120.

Dog 102 may be a domesticated member of the genus Canis that may be kept by a person for companionship and enjoyment. Dog 102 may be thought of as a household pet or companion animal and generally is not an animal kept for economic reasons. Dog 102 may communicate by vocalizing a sound that may be imitated by the word "bark."

Dog pen 104 may be an enclosure to confine dog 102 within a predefined territory. Dog pen 104 may have a front pen area 124 near sprinkler head 122 and a rear pen area 126 on a side that may be remote from sprinkler head 122 and on an opposite side of front pen area 124. In addition, dog pen 104 may have four sides boarded by an enclosure 128. Enclosure 128 may have an open weave that permits water to pass through one side of enclosure 128 to and through an opposite side of enclosure 128. In one example, enclosure 128 may be a chain link fence.

Bark switch 106 may be a sound sensing device that may activate sprinkler head 122 when dog 102 barks. Bark switch 106 may be a device that makes or breaks a circuit as a function of received dog bark sounds. For example, if dog 102 barks in a predetermined intensity, bark switch 106 may close a circuit that permits power to flow from power supply 114 to transformer 108. If the sounds coming from dog 102 do not met the predetermined intensity, bark switch 106 may not close a circuit that permits power to flow from power supply 114 to keep dog 102 from being sprayed for low intensity dog barking sounds. Also, if the sounds coming from dog 102 do not met the predetermined intensity or there are no sounds from dog 102, dog 102 may be considered to have stopped barking and bark switch 106 may open the circuit to prevent power from flowing to water valve 110.

Bark switch 106 may have a control knob 130 to set bark switch 106 to activate under different levels of sound (different intensities). Control knob 130 may be rotated to adjust the activation settings, namely to set the values of a predetermined bark intensity.

Bark switch 106 may include an internal timer 132. Internal timer 132 may be utilized to control the length of time in which power may be transmitted to water valve 110 through transformer 108. This may regulate the time in which water may run from sprinkler head 122. Internal timer 132 may start counting from zero on bark switch 106 receiving a trigger sound. On reaching a predetermined count value, such as five to ten seconds, internal timer 132 may stop power flowing to water valve 110 by opening circuit within bark switch 106. Without power, water valve 110 may close and stop water spray 302 (FIG. 3) from spraying dog 102. Internal timer 132 automatically may be reset to zero each time a new bark trigger sound is received by bark switch 106 so that power may flow continuously to water valve 110. Thus, a dog 102 that chooses to continue to bark will continue to receive a spray of water.

Transformer 108 may be a static device that transfers electrical energy from bark switch 106 to water valve 110 through magnetic coupling. Here, transformer 108 may transform the voltage from bark switch 106 by stepping it down to a voltage utilized by water valve 110. In one example, transformer 108 approximately may step down the voltage from bark switch 106 by a value of five. In another example, transformer 108 approximately may step down the approximately 120 volts from bark switch 106 to approximately 24 volts.

Water valve 110 may be a device that regulates the flow of water from supply hose 116 to spray hose 120 by opening and closing a passageway. Water valve 110 may include a solenoid coil electrically connected to transformer 108 and positioned about a spring biased, metal piston. The piston may sit on a port hole to prevent water flow from supply hose 116 to spray hose 120. When transformer 108 passes electricity into the solenoid coil, the solenoid coil may lift the piston off the port hole. The now open port hole may permit water pressure to equalize within water valve 110 and open water valve 110. When transformer 108 stops passing electricity into the solenoid coil, spring force may push down on the metal piston to close the port hole. This, in turn, may close water valve 110 to stop water flow from supply hose 116 to spray hose 120. Water valve 110 may operate off a low voltage, such as twenty-four volts.

Building 112 may be a structure to shelter and mount bark switch 106, transformer 108, and water valve 110. In the northern zones of the United States, the temperature may fall below the point where water freezes (thirty-two degrees Fahrenheit). By placing components inside building 112, system 100 may continue to operate even below the point where water freezes. As noted above, bark switch receiver 107 may reside outside of building 112 to receive dog barking sounds. Building 112 may be optional for warmer areas.

Building 112 may include a thermostat 113 extending both outside and inside building 112 to sense temperature outside of building 112 and inside building 112 and to operate a heater 115. Heater 115 may be a device to warm an interior of building 112. Heater 115 may be responsive to thermostat 113 and turn on and off based on signals from thermostat 113.

Power supply 114 may be a device or system to supply electrical energy to system 100 in general and water valve 110 in particular. Power supply 114 also may supply electrical energy to heat building 112. Power supply 114 may receive electrical energy from an electrical grid within residential home 134. In one example, power supply may provide approximately 120 volts.

Supply hose 116 may be a flexible pipe configured to convey water. Supply hose 116 may be a tube connected to water supply 118 on a first end and connected to an upstream side of water valve 110 on a second end. Water supply 118 may originate water into system 100 and may be a fitting to connect supply hose 116 to the water piping system of residential home 134 and to control the amount of water flow to sprinkler head 122. Spray hose 120 may be a flexible pipe configured to convey water. Spray hose 120 may be a tube connected to a downstream side of water valve 110 on a first end and connected to sprinkler head 122 on a second end.

Sprinkler head 122 may be a device that may be configured to distribute water over a first spray area 136 and a second spray area 138. First spray area 136 may include all of second spray area 138. First spray area 136 substantially may include all of dog pen 104, including front pen area 124 and rear pen area 126. When initially training dog 102, it may be important that dog 102 be hit by water spray no matter where dog 102 resides in dog pen 104.

A doghouse 140 may be located within dog pen 104 in rear pen area 126. This may provide dog 102 with a location where dog 102 may retreat to be sheltered from the spray of water or to get out of the range of the spray of water. As long as dog 102 continues to bark, sprinkler head 122 may distribute water into pen 104. However, when dog 102 is inside doghouse 140, doghouse 140 may muffle the dog barking sounds even as dog 102 continues to bark for a few seconds after entering doghouse 140. Muffling the dog barking sounds may result in stopping the water spray. In one example, bark switch 106 may be located on top of doghouse 140 directly above a doghouse opening 142.

Second spray area 138 may include less than all of dog pen 104 to provide a location within dog pen 104 where dog 102 may avoid being sprayed by water. Second spray area 138 may be utilized where dog 102 has undergone some training and may be more aware of appropriate times to bark. In one example, a region bounded by second spray area 138 approximately may be seventy-five to eighty percent of a region bounded by first spray area 136. In another example, a region bounded by second spray area 138 approximately may be thirty to sixty percent of a region bounded by first spray area 136.

Sprinkler head 122 may be positioned near the dog's territory at a sprinkler head distance 144 from dog pen 104. In one example, sprinkler head distance 144 may be three to five feet. Water from sprinkler head 122 may be distributed in a fan shape and the distance traveled by water from sprinkler head 122 may be predetermined by adjusting sprinkler head 122 or adjusting water supply 118.

Sprinkler head 122 may be part of a rotary impact sprinkler to allow more control over the water spray. The rotary motion may be set to rotate in a full or partial circle. Thus, the motion of sprinkler head 122 may be adjusted to cover the area in which a user deems necessary to sprinkle their dog with water to stop the dog from barking. Alternatively, sprinkler head 122 may include a fan spray nozzle. Water supply 118 may be adjusted to control the distance water travels from sprinkler head 122, such as keeping water within second spray area 138 or letting the water spray into first spray area 136.

Figure 2:
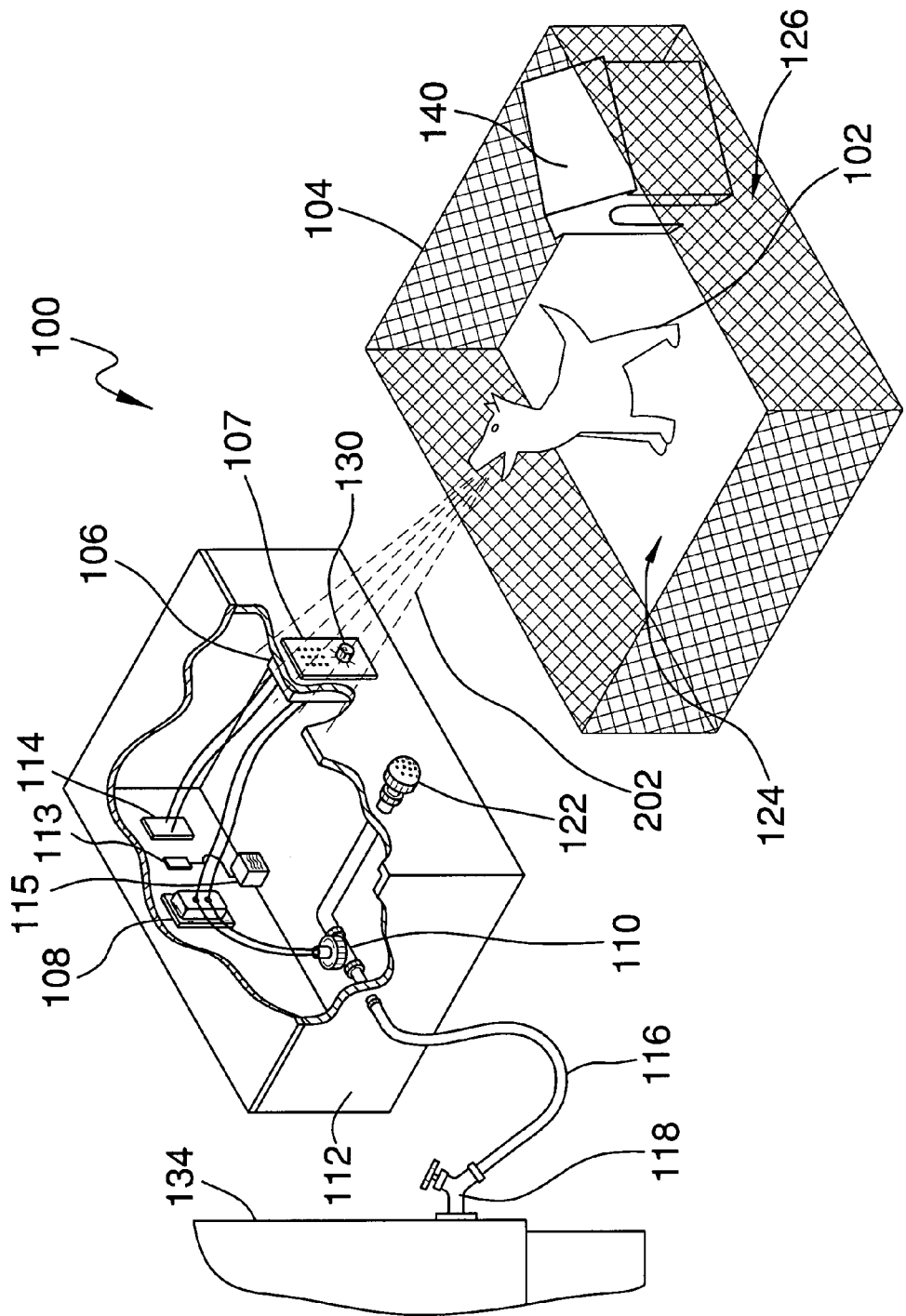
FIG. 2 is an isometric view of system 100 with dog 102 producing barking sounds 202.

FIG. 2 is an isometric view of system 100 with dog 102 producing barking sounds 202. Bark switch receiver 107 of bark switch 106 may receive barking sounds 202 and permit electrical power to pass from power supply 114 to water valve 110 to open water valve 110. Although dog 102 is shown positioned in front pen area 124, dog 102 may be positioned in rear pen area 126 in a different example and barking sounds 202 still may reach bark switch receiver 107.

Figure 3:
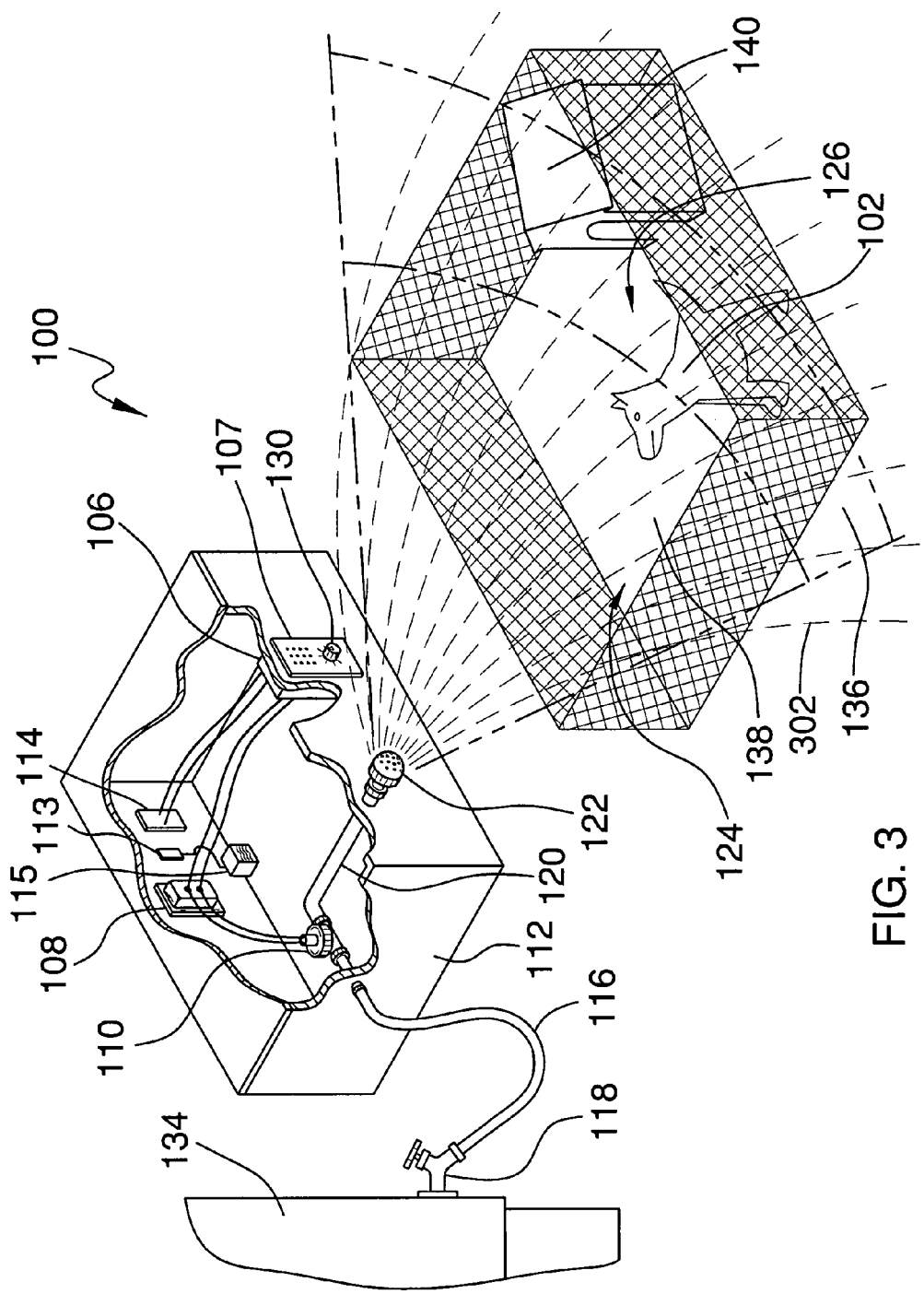
FIG. 3 is an isometric view of system 100 with water spray 302 emanating from sprinkler head 122.

FIG. 3 is an isometric view of system 100 with water spray 302 emanating from sprinkler head 122. A natural inclination of dog 102 would be to move away from the source of water spray 302—away from sprinkler head 122. Even so, dog 102 may be in first spray area 136 but nonetheless be hit by water spray 302. Dog 102 alternatively may choose to enter doghouse 140 in first spray area 136 to avoid being hit by water spray 302. While in doghouse 140, barks from dog 102 may be muffled. This may keep others from being disturbed by such barks. When dog 102 demonstrates a predetermined level of learned barking control behavior, system 100 may be adjusted to keep water spray 302 within second spray area 138 to remind dog 102 about the barking lessons without directly spraying dog 102. System 100 may be adjusted to keep water spray 302 within second spray area 138 such as by adjusting water supply 118. For example, water supply 118 may be adjusted by turning a lever to open or close a valve to adjust the water pressure within system 100. Sprinkler head 122 may be adjusted to control the amount of water spray 302 leaving sprinkler head 122. In one example, a screw may be rotate to alter flow from sprinkler head 122.

Figure 4:
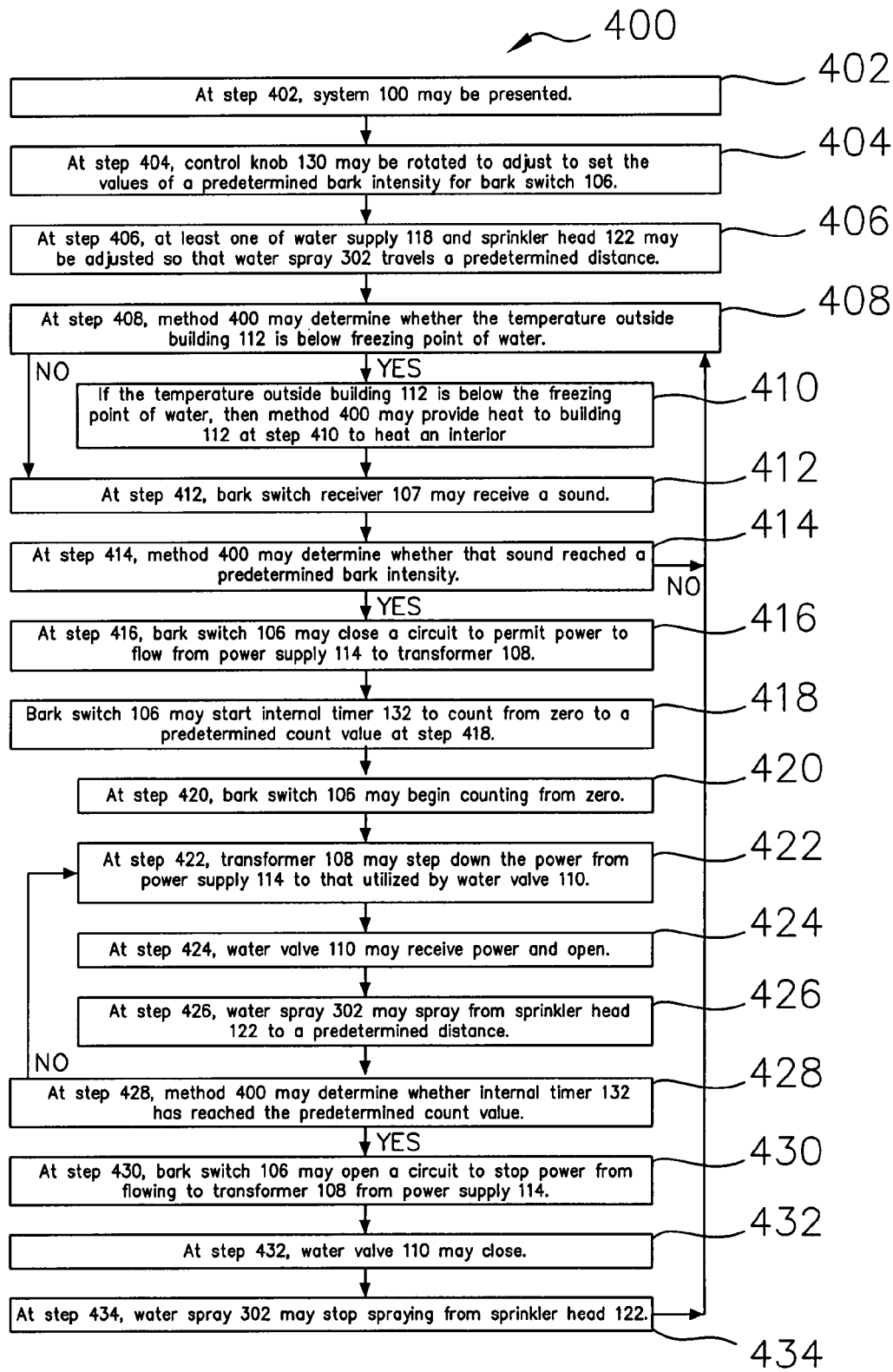
FIG. 4 is a method 400 to utilize system 100 to train dogs to reduce their barking when being kept outdoors.

FIG. 4 is a method 400 to utilize system 100 to train dogs to reduce their barking when being kept outdoors. At step 402, system 100 may be presented. At step 404, control knob 130 may be rotated to adjust to set the values of a predetermined bark intensity for bark switch 106. At step 406, at least one of water supply 118 and sprinkler head 122 may be adjusted so that water spray 302 travels a predetermined distance. At step 408, method 400 may determine whether the temperature outside building 112 is below the freezing point of water. A temperature-measuring device attached to an outside of building 112 may achieve this. If the temperature outside building 112 is not below the freezing point of water, then method 400 may proceed to step 412. If the temperature outside building 112 is below the freezing point of water, then method 400 may provide heat to building 112 at step 410 to heat an interior.

At step 412, bark switch receiver 107 may receive a sound. At step 414, method 400 may determine whether that sound reached a predetermined bark intensity. If that sound reaches a predetermined bark intensity, then method 400 may proceed to step 416. If that sound does not reach a predetermined bark intensity, then method 400 may return to step 408.

At step 416, bark switch 106 may close a circuit to permit power to flow from power supply 114 to transformer 108. Simultaneously, bark switch 106 may start internal timer 132 to at step 418. At 420, bark switch 106 may begin counting from zero.

At step 422, transformer 108 may step down the power from power supply 114 to that utilized by water valve 110. At step 424, water valve 110 may receive power and open. At step 426, water spray 302 may spray from sprinkler head 122 to a predetermined distance.

At step 428, method 400 may determine whether internal timer 132 has reached the predetermined count value. If internal timer 132 has reached the predetermined count value, then method 400 may proceed to step 430. If internal timer 132 has not reached the predetermined count value, then method 400 may return to step 422.

At step 430, bark switch 106 may open a circuit to stop power from flowing to transformer 108 from power supply 114. At step 432, water valve 110 may close. At step 434, water spray 302 may stop spraying from sprinkler head 122. Method 400 then may return to step 408.

The system may include may a water sprinkler that may be used to discipline or train a dog. The system may include a sprinkler that may be attached to a hose and placed near the dog's territory. The unit may have a sound sensing device that may activate the sprinkler when the dog barks, thus providing a correction to stop the barking. The system may be especially effective with dogs that may not respond to voice commands and only react to a physical correction. The system may include a timer as well as with various sprinkler types.

Dogs generally do not like to be sprayed with a jet blast of water. When the dog barks, it may activate a switch that may send power to a transformer. The transformer may send power to a water valve to open the water valve. Opening the water valve may send water to a sprinkler that may spray the barking dog located in a predetermined area. The predetermined area may be a dog pen or confined area in which the dog lives. The dog then may retreat to a dog house and stop barking.

The system may address a need for a pet training device that may enable the user to easily discipline or train a dog. Appealing features of the system may be its convenience, practicality, durability, and ease of use. The system may be adjusted for various sizes of dogs and various stages of learning for the dog. Pet owners utilizing the system may control their dogs, and may stop the pet from barking or howling when being kept outdoors. Once the pet has activated the sprinkler a number of times, it may be broken of the bad habits due to the corrective reinforcements. This system may appeal to dog owners as a convenient way to control their pets and prevent their neighbors from being disturbed.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A method to train a dog to reduce barking from the dog while the dog is kept outdoors in a dog pen, the method comprising in the following order the steps of:
   (i) presenting an anti-bark training system having a bark switch connected between a transformer and a power supply, a water valve operatively connected to the transformer and connected between a supply hose and a spray hose, a water supply connected to the supply hose, a sprinkler head connected to the spray hose, wherein the dog pen has an enclosure to confine the dog within a predefined territory, wherein the dog pen includes a front pen area near the sprinkler head and a rear pen area on a side that is remote from the sprinkler head and on an opposite side of the front pen area, wherein the dog pen enclosure is configured to permit water to spray through the dog pen enclosure, wherein the bark switch, the transformer, and the water valve reside inside a building having a thermostat to measure temperature inside and outside the building and a heater connected to the thermostat, wherein a bark switch receiver of the bark switch is positioned outside of the building to receive barking sounds from the dog, wherein the bark switch includes a control knob configured to rotate to set the bark switch to activate at a predetermined bark intensity, and wherein the bark switch includes an internal timer that is configured to control a length of time in which power is transmitted to the transformer after power initially is transmitted to the transformer from the bark switch;
   (ii) receiving a setting of a predetermined bark intensity for the bark switch from the control knob;
   (iii) adjusting at least one of the water supply and the sprinkler head so that the water spray from the sprinkler head travels a predetermined distance;
   (iv) waiting to receive a sound in the bark switch;
   (v) receiving a sound in the bark switch;
   (vi) if the sound received by the bark switch does not reach the predetermined bark intensity, then return to step (iv);
   (vii) if the sound received by the bark switch reaches the predetermined bark intensity, then close a circuit in the bark switch to permit power to flow from the power supply to the transformer and start the internal timer;
   (vii)(A) initiating counting from zero in the bark switch
   (vii)(B) stepping down the power in the transformer and sending that step downed power to the water valve;
   (vii)(C) spraying water spray from the water valve to the predetermined distance to spray the dog with water;

(vii)(D) if the internal timer has not reached the predetermined count value, then the method returns to step (vii)(B);

(viii) if the internal timer has reached the predetermined count value, then open a circuit in the bark switch to close the water valve and stop the water sprayer from spraying water;

(ix) the method returns to step (iv), wherein the dog pen is divided into a first spray area and a second spray area, wherein the first spray area substantially includes all of the dog pen and wherein the second spray area includes the front pen area and includes less than all of the dog pen, wherein a region bounded by the second spray area approximately is seventy-five to eighty percent of a region bounded by the first spray area, wherein water spray from the water sprinkler is configured to spray into the second spray area only;

before step (iv), determining whether the temperature outside the building is below the freezing point of water; and if the temperature outside the building is not below the freezing point of water, then the method proceeds to step (iv) and if the temperature outside building is below the freezing point of water, then heating the building interior.

2. The method of claim 1, wherein the bark switch is configured to pass power from the power supply to the transformer on receiving a bark of a predetermined intensity and to otherwise prevent power from being passed from the power supply to the transformer.

3. The method of claim 2, further comprising:

as part of step (i), positioning the sprinkler head at a sprinkler head distance from the dog pen, wherein the sprinkler head distance is three to five feet.

4. A method to train a dog to reduce barking from the dog while the dog is kept outdoors in a dog pen, the method comprising in the following order the steps of:

(i) presenting an anti-bark training system having a bark switch connected between a transformer and a power supply, a water valve operatively connected to the transformer and connected between a supply hose and a spray hose, a water supply connected to the supply hose, a sprinkler head connected to the spray hose, wherein the dog pen has an enclosure to confine the dog within a predefined territory, wherein the dog pen includes a front pen area near the sprinkler head and a rear pen area on a side that is remote from the sprinkler head and on an opposite side of the front pen area, wherein the dog pen enclosure is configured to permit water to spray through the dog pen enclosure, wherein the bark switch, the transformer, and the water valve reside inside a building having a thermostat to measure temperature inside and outside the building and a heater connected to the thermostat, wherein a bark switch receiver of the bark switch is positioned outside of the building to receive barking sounds from the dog, wherein the bark switch includes a control knob configured to rotate to set the bark switch to activate at a predetermined bark intensity, wherein the bark switch includes an internal timer that is configured to control a length of time in which power is transmitted to the transformer after power initially is transmitted to the transformer from the bark switch, wherein the enclosure includes a doghouse having a doghouse opening and the bark switch is located on top of the doghouse directly above the doghouse opening;

(ii) receiving a setting of a predetermined bark intensity for the bark switch from the control knob;

(iii) adjusting at least one of the water supply and the sprinkler head so that the water spray from the sprinkler head travels a predetermined distance;

(iv) waiting to receive a sound in the bark switch;

(v) receiving a sound in the bark switch;

(vi) if the sound received by the bark switch does not reach the predetermined bark intensity, then return to step (iv);

(vii) if the sound received by the bark switch reaches the predetermined bark intensity, then close a circuit in the bark switch to permit power to flow from the power supply to the transformer and start the internal timer;

(vii)(A) initiating counting from zero in the bark switch (vii)(B) stepping down the power in the transformer and sending that step downed power to the water valve;

(vii)(C) spraying water spray from the water valve to the predetermined distance to spray the dog with water;

(vii)(D) if the internal timer has not reached the predetermined count value, then the method returns to step (vii)(B);

(viii) if the internal timer has reached the predetermined count value, then open a circuit in the bark switch to close the water valve and stop the water sprayer from spraying water;

(ix) the method returns to step (iv);

before step (iv), determining whether the temperature outside the building is below the freezing point of water; and if the temperature outside the building is not below the freezing point of water, then the method proceeds to step (iv) and if the temperature outside building is below the freezing point of water, then heating the building interior.

5. The method of claim 4, wherein the bark switch is configured to pass power from the power supply to the transformer on receiving a bark of a predetermined intensity and to otherwise prevent power from being passed from the power supply to the transformer.

6. The method of claim 5, further comprising:

as part of step (i), positioning the sprinkler head at a sprinkler head distance from the dog pen, wherein the sprinkler head distance is three to five feet.

7. The method of claim 6, wherein the dog pen is divided into a first spray area and a second spray area, wherein the first spray area substantially includes all of the dog pen and wherein the second spray area includes the front pen area and includes less than all of the dog pen, wherein a region bounded by the second spray area approximately is seventy-five to eighty percent of a region bounded by the first spray area, wherein water spray from the water sprinkler is configured to spray into the second spray area only.

* * * * *